United States Patent
Tani et al.

(10) Patent No.: US 6,211,857 B1
(45) Date of Patent: *Apr. 3, 2001

(54) INTERACTION SUPPORT SYSTEM AND METHOD

(75) Inventors: Masayuki Tani; Toshifumi Arai; Koichiro Tanikoshi; Shinya Tanifuji, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/967,019

(22) Filed: Nov. 10, 1997

Related U.S. Application Data

(63) Continuation of application No. 08/290,117, filed on Aug. 15, 1994, now Pat. No. 5,777,597, which is a continuation of application No. 08/086,360, filed on Jul. 6, 1993, now abandoned, which is a continuation of application No. 07/926,390, filed on Aug. 10, 1992, now abandoned, which is a continuation of application No. 07/325,377, filed on Mar. 20, 1989, now abandoned.

(30) Foreign Application Priority Data

Mar. 23, 1988 (JP) .................................................. 63-67132

(51) Int. Cl.[7] ........................................................ G09G 5/36
(52) U.S. Cl. ........................... 345/133; 345/146; 345/354
(58) Field of Search .................................. 345/145, 146, 345/157, 163, 168, 113, 114, 115, 116, 127, 128, 129, 130, 133, 118, 121, 326, 328, 333, 334, 347, 348, 352, 353, 354, 131

(56) References Cited

U.S. PATENT DOCUMENTS

| | | | |
|---|---|---|---|
| 4,656,603 | 4/1987 | Dunn | 340/747 |
| 4,683,468 | 7/1987 | Himelstein et al. | 340/747 |
| 4,686,522 | 8/1987 | Hernandez et al. | 340/709 |
| 4,731,609 | 3/1988 | Reynolds et al. | 340/747 |
| 4,841,291 | 6/1989 | Swix et al. | 340/725 |
| 4,847,605 | 7/1989 | Callahan et al. | 340/709 |
| 4,931,957 | 6/1990 | Takagi et al. | 340/747 |
| 5,777,597 | * 7/1998 | Tani et al. | 345/133 |

FOREIGN PATENT DOCUMENTS

| | | |
|---|---|---|
| 0192927 | 7/1986 | (EP) . |
| 0243051 | 10/1987 | (EP) . |

OTHER PUBLICATIONS

D. Goodman, "The Complete Hyper Card Handbook", 1987, pp. 369–383.
W. Buxton, et al., "Towards a Comprehensive User Interface Management System", Computer Graphics, vol. 17, No. 3, Jul. 1983, pp. 35–42.
D. Goodman, "The Complete Hyper Card Handbook", 1987, pp. 161–183.
*Information Processing Society of Japan,* "A System for Developing User Inter–face (1)—Design Concept", M. Tani, et al., Hitachi Research Laboratory, Hitachi, Ltd.
"Macpaint", a menu of Macintosh.

* cited by examiner

*Primary Examiner*—Xiao Wu
(74) *Attorney, Agent, or Firm*—Antonelli, Terry, Stout & Kraus, LLP

(57) ABSTRACT

An interaction support system in which a figure processing program is run so that each of the constituent elements of a displayed figure is expressed in the form of coordinate points of a circumscribed polygon thereof and actions are sequentially defined with respect to the elements respectively. After actions have been defined with respect to the respective overlapped constituent elements, the defined actions are sequentially carried out in the run stage. An action for one figure element may be defined during defining operation of another figure element.

12 Claims, 16 Drawing Sheets

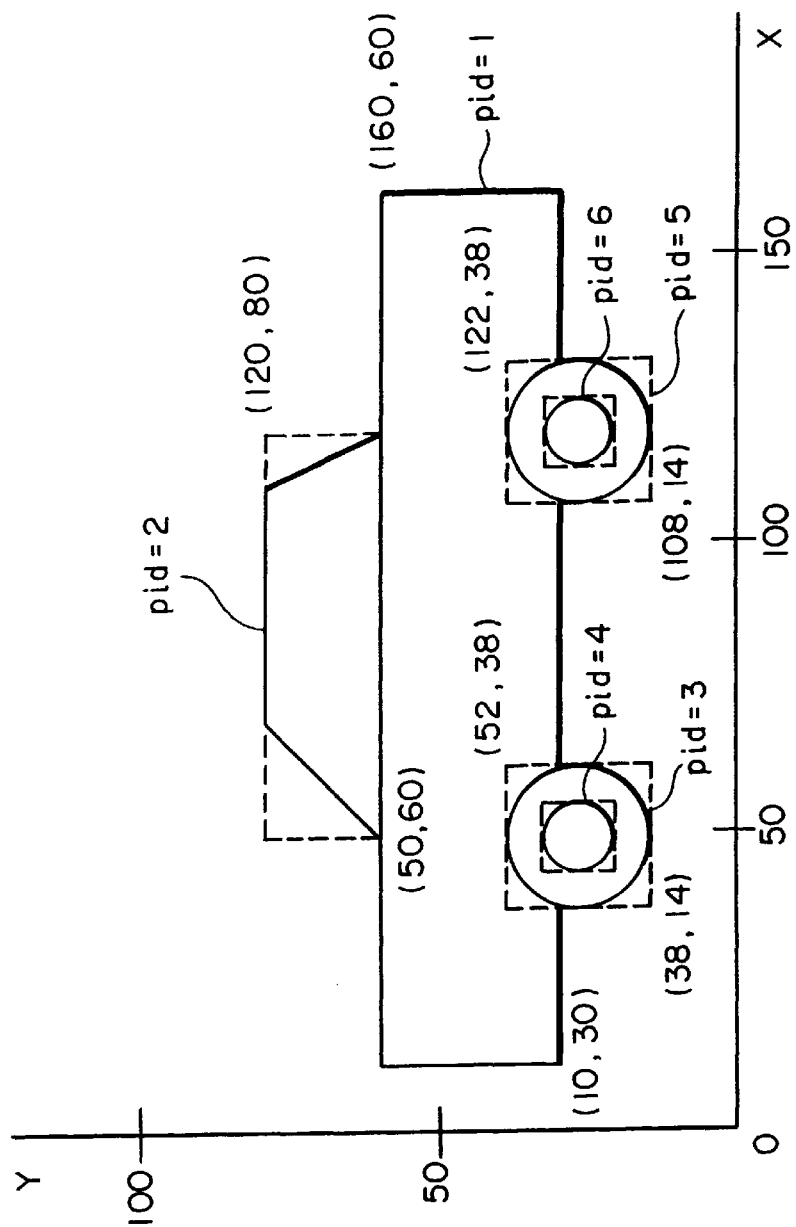

CIRCUMSCRIBED RECTANGLE AREA FOR A AND B

INTERACTION SUPPORT SYSTEM AND METHOD

This application is a Continuation of application Ser. No. 08/290,117, filed Aug. 15, 1994 now U.S. Pat. No. 5,777,597; which is a continuation of application Ser. No. 08/086,360, filed Jul. 6, 1993, now abandoned; which is a continuation of application Ser. No. 07/926,390, filed Aug. 10, 1992, now abandoned; which is a continuation of application Ser. No. 07/325,377, filed on Mar. 20, 1989, now abandoned.

BACKGROUND OF THE INVENTION

The present invention relates to an interaction support system and method in which data created under control of a drawing program are utilized to develop an interaction display screen for a run program and actions are defined with respect to arbitrary objects in a defined picture displayed on the interaction screen.

As computer hardware advances, there have been developed many interactive run programs which are based on frequent graphical display. These run programs require not only a program part for computation of numerical values or for problem solution but also a program part for interaction between user and run program through the graphical display such as the understandable indication of computational results or the user's input prompting indication on the screen. Recently, it is not rare that the program part for interaction between user and run program occupies more than 50% of the whole development of the run program. For this reason, in order to improve the development efficiency of the run program, it becomes necessary to support the development of such interaction program part.

In the development of such interactive run program based on graphical display, conventionally, a defined picture desired to be displayed on the screen is prepared and then the program part for causing the display of the same defined picture on the screen is created. For commercial run programs, such display design is often conducted by an art design specialist.

Meanwhile, there has been recently developed such a drawing program that performs such drawing and designing work under control of a computer. Defined pictures for display design of the run programs tend to be often created using such drawing program. Such tendency is because the design results can be stored as data in the computer, the design can be easily modified and edited, and also easily deposited and retrieved. Such drawing program, however, has been originally designed to aim mainly at printing the defined picture on paper, and much consideration has not been paid to the utilization of the design results stored within the computer by other run programs. For this reason, even in the case where a defined picture for the interactive display of a run program is prepared using a computer, it has been necessary to newly create the interactive screen display part of the run program.

Upon developing the interactive screen display part of the run program, if data on the defined picture on the screen drawn by the drawing program in the computer can be used as they are, then the development efficiency of the run program can be improved. A prior art system of utilizing data created by a drawing program to provide an interactive screen for a run program is discussed in a book titled "Towards a Comprehensive User Interface Management System", Computer Graphics, Volume 17, Number 3, July (1983), pp 35–42. In this system, one picture or a plurality of pictures, which are previously created by the drawing program and registered as files, are freely laid out on the screen and actions are defined with respect to the respective pictures to be correlated with processing procedures peculiar to the pictures.

With this system, however, one of the actions can be defined only with respect to one of the pictures previously registered as files and cannot be defined with respect to only part or figures of one picture. This requires, on drawing a defined picture, the need for previous registration of a picture part whose action is to be previously defined, in a separate file. Further, when it is desired to modify that part of a picture whose action is to be defined, it becomes necessary to modify the file organization once more or redraw the picture, which results in a low work efficiency. In addition, data on defined pictures created by the drawing program cannot be utilized in developing a screen display program. Even in the event where the defined picture data can be utilized, different actions cannot be defined with respect to any ones of the constituent elements of the picture, which disadvantageously results in that, at the time of creating a defined picture, different files must be previously provided and stored for different parts of the defined picture whose actions are to be defined.

SUMMARY OF THE INVENTION

It is an object of the present invention to provide an interaction support system and method in which different actions can be defined with respect to different arbitrary constituent elements of a defined picture on an interactive screen drawn by a drawing program.

Another object of the invention is for a designer to directly define an action with respect to any one of the constituent elements of a defined picture drawn on the display screen. This enables the elimination of the need for creation of a display program for defined-picture display and the improvement of development efficiency of a run program.

A further object of the invention is to provide an interaction support method which can define actions with respect to the respective constituent elements of a picture already drawn.

The above objects are attained by providing a system which comprises figure means for providing a character or a figure on a display, means for specifying one displayed object or a plurality of displayed objects provided on the display, and means for defining predetermined action or actions with respect to the displayed object or the plurality of displayed objects specified by the displayed-object specifying means. These objects are also attained by providing a system which comprises means for reading in a defined picture data previously created by another device, means for specifying one displayed object or a plurality of displayed objects read on a display by the defined-object reading means, and means for defining predetermined action or actions with respect to the displayed object or the plurality of displayed objects specified by the displayed-object specifying means. The system itself can comprise means for drawing a character or a figure.

A designer for the interactive display screen freely draws a design on the display screen with use of the drawing means. The designer first specifies one displayed object or any ones of a plurality of displayed objects in a defined picture drawn on the display with use of the displayed-object specifying means, and then a programmer for creating a run program for the interactive display defines an action or actions for the specified display object or objects with use of the action defining means.

BRIEF DESCRIPTION OF THE DRAWINGS

FIG. 11 shows an example of a drawn picture:

DESCRIPTION OF THE PREFERRED EMBODIMENT

Figure 5:
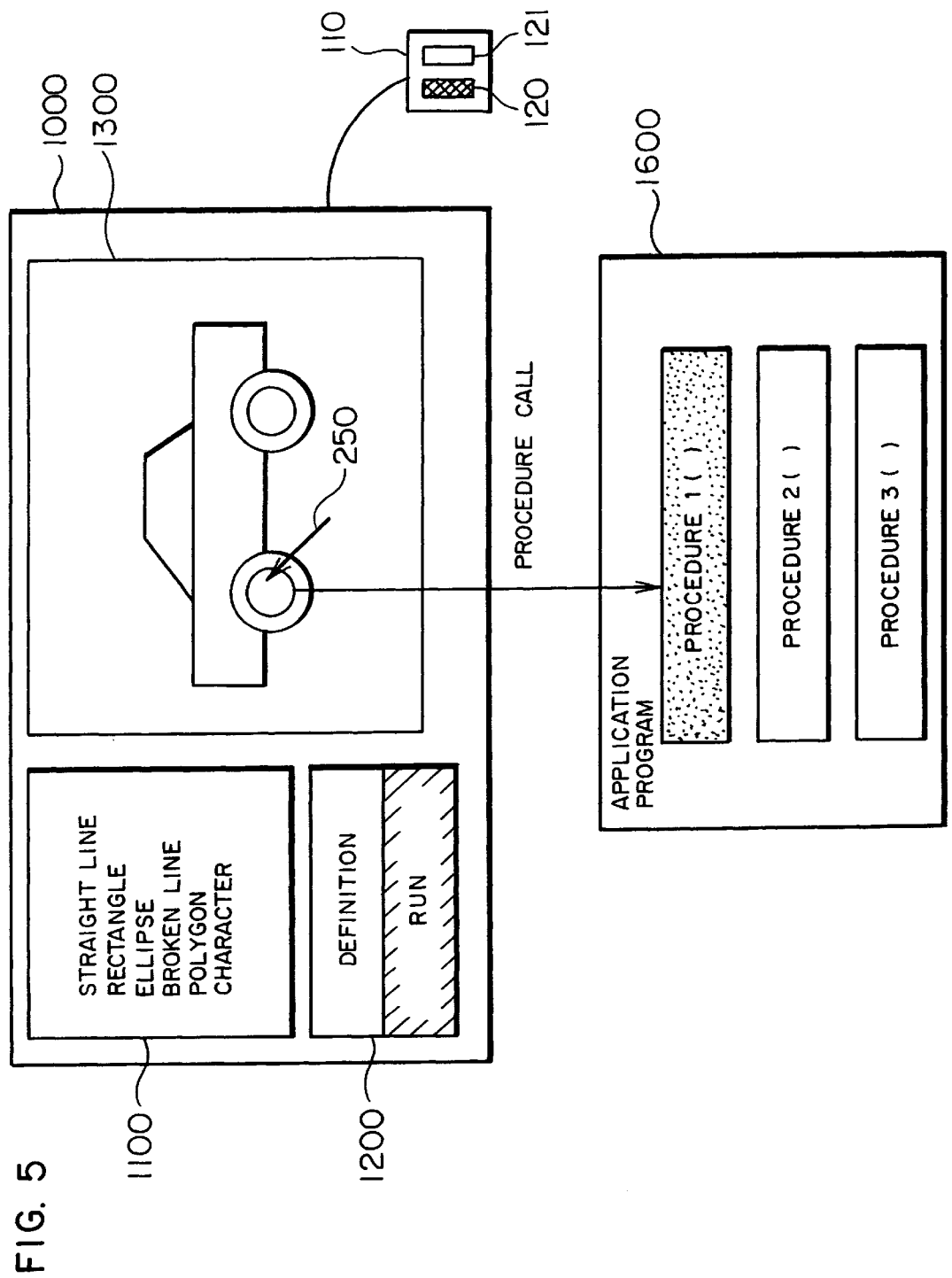
Figure 6:
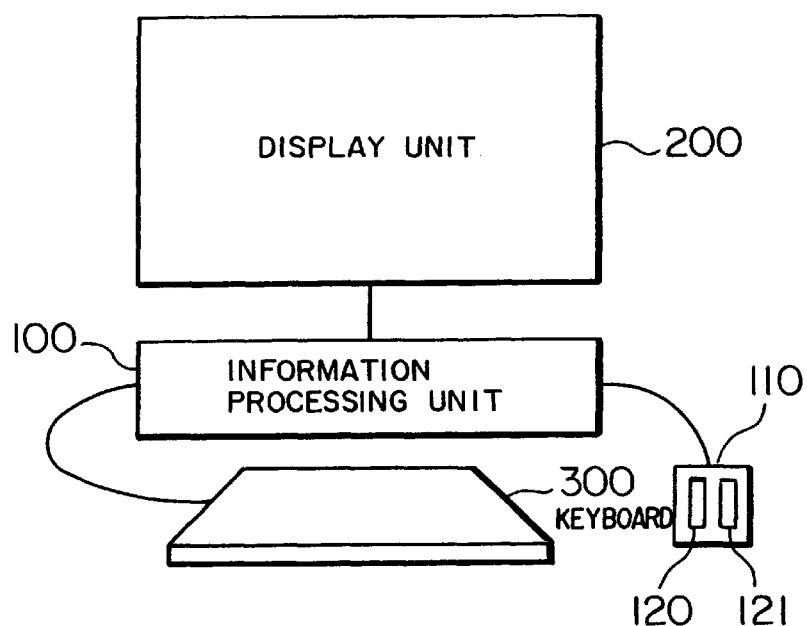
FIG. 6 is a general arrangement of the embodiment.
Figure 7:
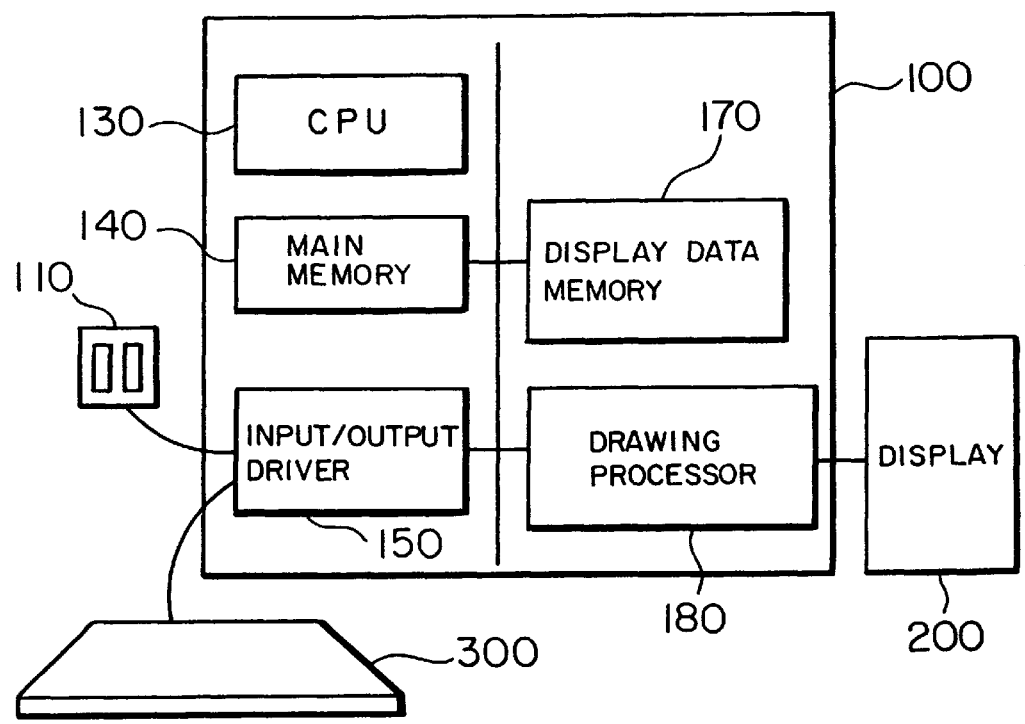
FIG. 7 is an arrangement of an information processing unit in the embodiment.

An embodiment of the present invention will be explained by referring to FIGS. 1 to 20. Referring first to FIG. 6, there is shown a general arrangement of an interaction support system, to which the present invention is applied and which comprises an information processing unit 100, a display unit 200, a mouse 110 having buttons 120 and 121 provided thereon, and keyboard 300. Shown in FIG. 7 is the interior arrangement of the information processing unit 100 which includes a central processing unit (CPU) 130, a main memory 140, an input/output driver 150, a display data memory 170 and a drawing processor 180.

FIGS. 1 to 5 show a series of display screens of the display unit 200. More specifically, in the drawings, reference numeral 1000 denotes a display screen, 1300 a drawing area, 1100 a drawing menu, 1200 a definition menu, 250 a cursor, 1301 to 1306 drawn figures respectively.

When the mouse 110, which is an input device which specifies a two-dimensional coordinate point, is moved by the user, the mouse 110 reports its own moved amount to the information processing unit 100 in the form of a two-dimensional vector value (specifically, expressed in terms of amounts shifted in X and Y directions in a two-dimensional rectangular coordinate system XY). The buttons 120 and 121 are respectively switch mechanisms which have each two states, i.e., depressed and released states. Each time one of the buttons is changed between the two states, the mouse 110 informs the information processing unit 100 of the sort of the changed state (the depressed or released state of the button 120 or 121) and of the changed button. On the other hand, the mouse 110, when receiving an inquiry from the information processing unit, reports the current button state (the depressed or released state) to the information processing unit. In FIGS. 1 to 5 for the purpose of the explanation of the embodiment, the hatched button 120 or 121 indicates the button is in the depressed state, and the non-hatched button indicates the button is in the released state.

The keyboard 300, which is used to input character codes, has a plurality of keys corresponding to the character codes. The keys, like the buttons of the mouse 110, are switch mechanisms which have each two depressed and released states. The keyboard 300, each time ones of the keys are changed in their state, reports to the information processing unit 100 the sorts (the key depressed or release state) of the changed keys and the changed keys.

The input/output driver 150 acts to control one coordinate point (the current coordinate point). More in detail, the driver 150 controls, as the current coordinate point, an initial coordinate point preset at the time of starting the system. The driver 150, when receiving a report on mouse shift from the mouse 110, adds the X- and Y-direction shifts respectively to the X and Y coordinate values of the current coordinate point to update the current coordinate point. Further, the input/output driver 150, each time renewing the current coordinate point, moves the indication position of the cursor 250 being indicated on the screen 1000 of the display unit 200 to a position corresponding to the current coordinate point on the screen. This enables the user to move the cursor 250 on the display screen 100 in response to the movement of the mouse 110. It goes without saying that the current coordinate point has its upper and lower limit values corresponding to the size of the screen so that, so long as the cursor 250 is located at the edge of the screen 1000, any movement of the mouse 110 will cause the cursor 250 not to be shifted therefrom outward of the screen.

When the input/output driver 150 receives a key state change report from the keyboard 300 and a mouse shift report from the mouse 110, the driver sequentially stores the contents of these reports in the order of report reception. A program to be executed in the information processing unit 100 can take out, by inquiring of the input/output driver 150, the report contents of the mouse 110 and buttons 120 and 121 from the input/output driver 150 in the order of its reception, or can make a reference to the current coordinate point. As a result, the program to be executed within the information processing unit 100 can know the movement of the mouse 110, the state change of the buttons 120 and 121, and the current position of the cursor 250.

The program to be executed in the information processor 100 is placed in the main memory 140 and executed under control of the CPU 130. Data display on the screen 1000 of the display unit 200 is carried out by writing a display data in the display data memory 170, specifying the heading address of the display data by the CPU 130 and then issuing an activation command to the drawing processor 180 from the CPU 130.

The display data in the display data memory 170 is interpreted and executed by the drawing processor 180. The display data can be divided into groups according to the arbitrary display figure unit, which groups are called segments and having their own identification numbers. The drawing processor 180 allows figures to be provided on the screen 100 and a figure already appearing on the screen to be erased from the screen on a segment basis. One segment consists of one figure element or plurality of figure elements.

The figure element is the minimum unit of the display figure which the drawing processor 180 can draw. Typical ones of the figure elements are straight line, rectangle, broken line, polygon, circle, ellipse, character string, free curve defined by a plurality of dots, marker and so on. Each of the figure elements may be attached with an identification number (which will be called PID). The run program to be executed within the information processing unit 100 can know, by making an inquiry to the drawing processor 180, the identification numbers of figure elements displayed in the vicinity of the specified position as well as the identification numbers of segments including the displayed figure elements.

Figure 17:
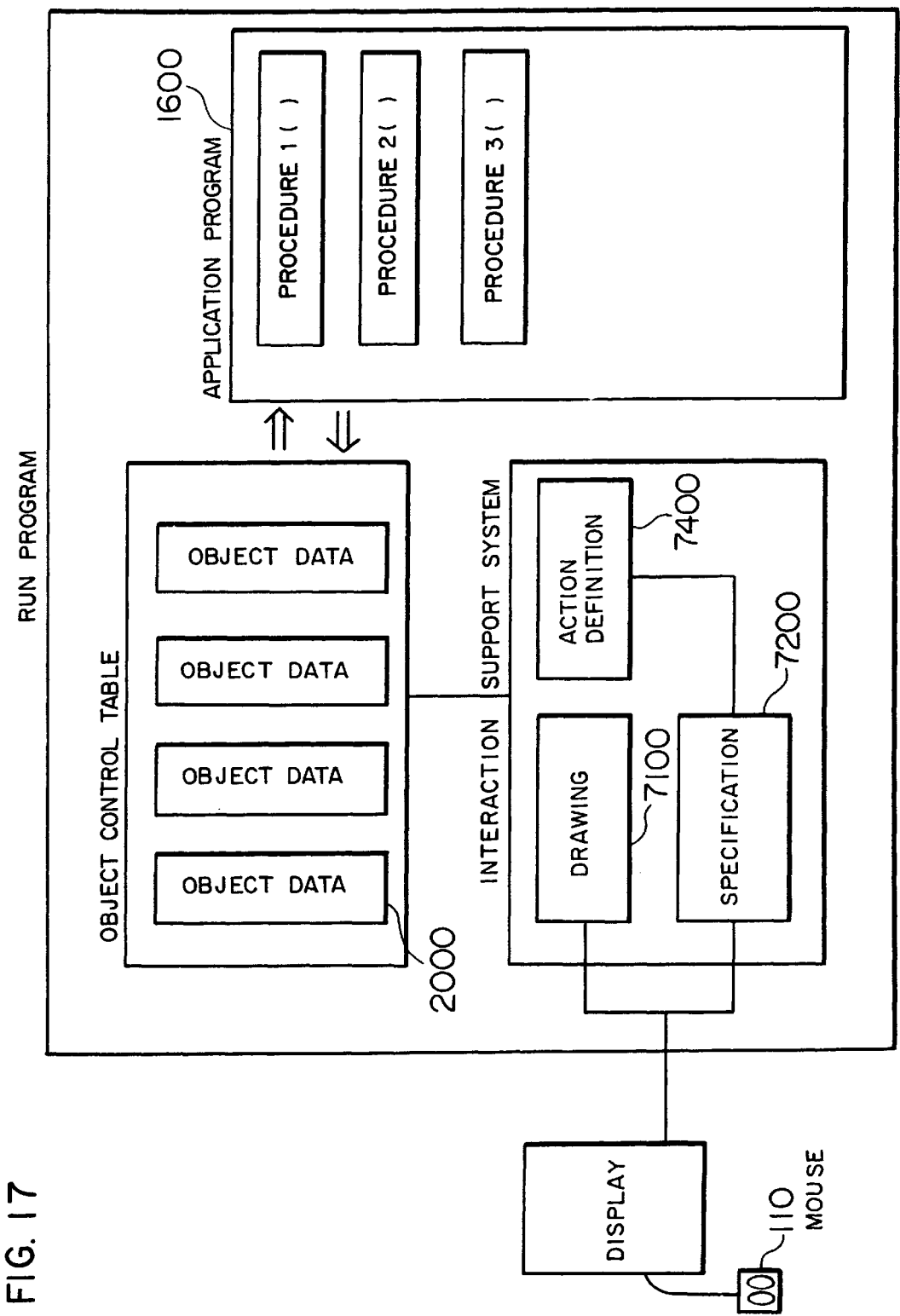
FIG. 17 is an arrangement of a run program.

The interaction support system of the present embodiment is shown in FIG. 17. The system develops a screen for user-interface with respect to a desired run program according to the following procedure.

First step: Draws a picture on the screen using a
drawing means 7100 by combining fundamental figures (such as straight line, rectangle and so on). At the same time, an object data 2000 is also created.
Second step: Specifies one fundamental figure or
a plurality of fundamental figures drawn on the screen using an indicating means 7200.
Third step: Defines, using an action defining
means 7400, the action of one fundamental figure or a plurality of fundamental figures specified in the second step.

Figure 1:
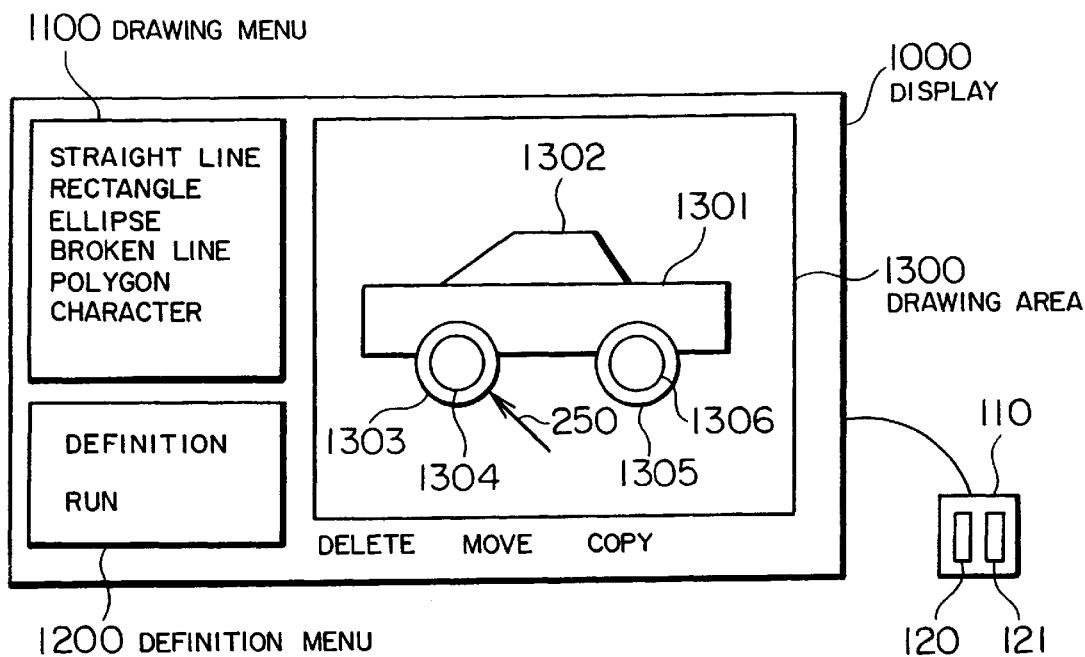
FIGS. 1 to 5 show a series of indication screens of a display in an embodiment of the present invention, respectively.

The above steps will be detailed with reference to FIGS. 1 to 4. FIG. 1 shows a car picture drawn on the screen by combining 6 fundamental figures of a rectangle 1301, a broken line 1302 and circles 1303 to 1306. These fundamental figures can be drawn on the screen by selecting desired one of the fundamental figures from the drawing menu 1100 and then specifying the position and size of the selected figure in the drawing area 1300, and so on. The menu item selection as well as the specification of the figure position and size can be realized by pointing a desired position with use of the cursor 250 operatively coupled to the mouse 110.

Figure 2:
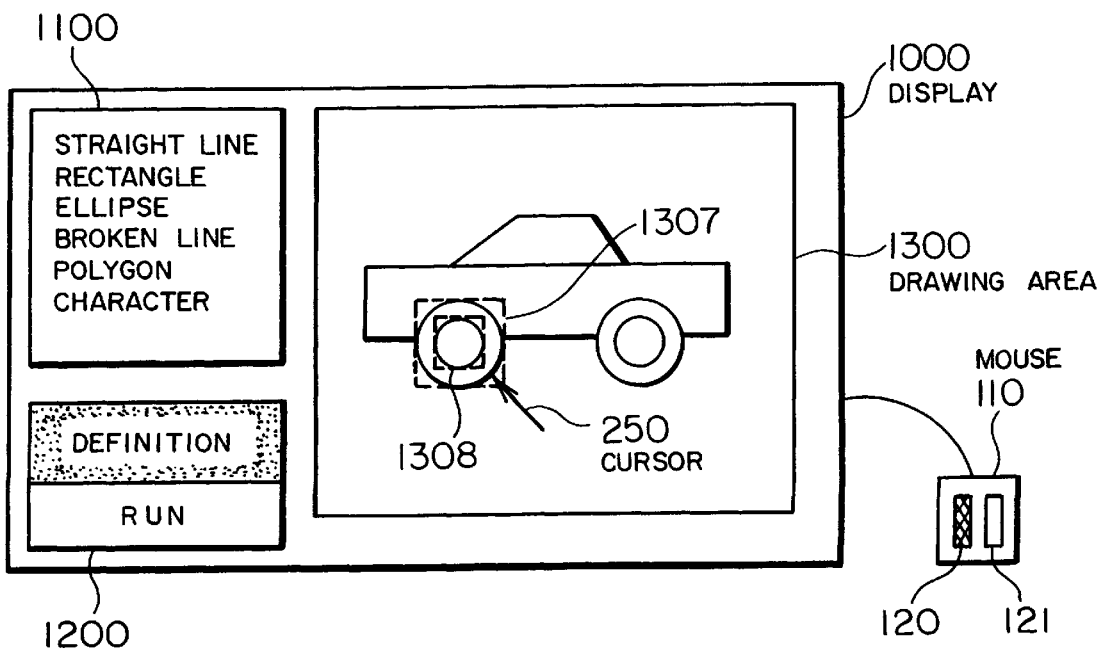

FIG. 2 shows a car picture identical with FIG. 1 but in which the two fundamental figures 1303 and 1304 corresponding to front wheels of the car are specified to define the action of the front wheels. Such figure specification is realized by selecting an item "definition" from the definition menu 1200, moving the cursor 250 onto the desired figure, pushing down the button 120 of the mouse 110 and then releasing the same. Such a series of depressing and releasing operations of the mouse button is known as "click". Figure click causes the circumscribed rectangle of the figure to be indicated by a dotted line. In FIG. 2, rectangles 1307 and 1308 denoted by dotted lines means that the circles 1303 and 1304 associated with the rectangles 1307 and 1308 have been specified as the objectives of action definition.

In the present system, a fundamental figure or an assembly of a plurality of fundamental figures to be subjected to the definition of action are called an object or objects. More specifically, the elements of a picture drawn on the display screen through the drawing means are respectively called objects. In FIG. 1, for example, each one of the fundamental figures 1301 to 1306 corresponds to an object. A plurality of objects may make up an object. After selection of the item "definition" (the dotted area in the drawings) of the definition menu 1200 as has been explained above, an object clicked by the mouse 110 becomes an object. In FIG. 2, for example, the specified circles 1303 and 1304 each become thereafter an object. An action is defined for each object.

Figure 3:
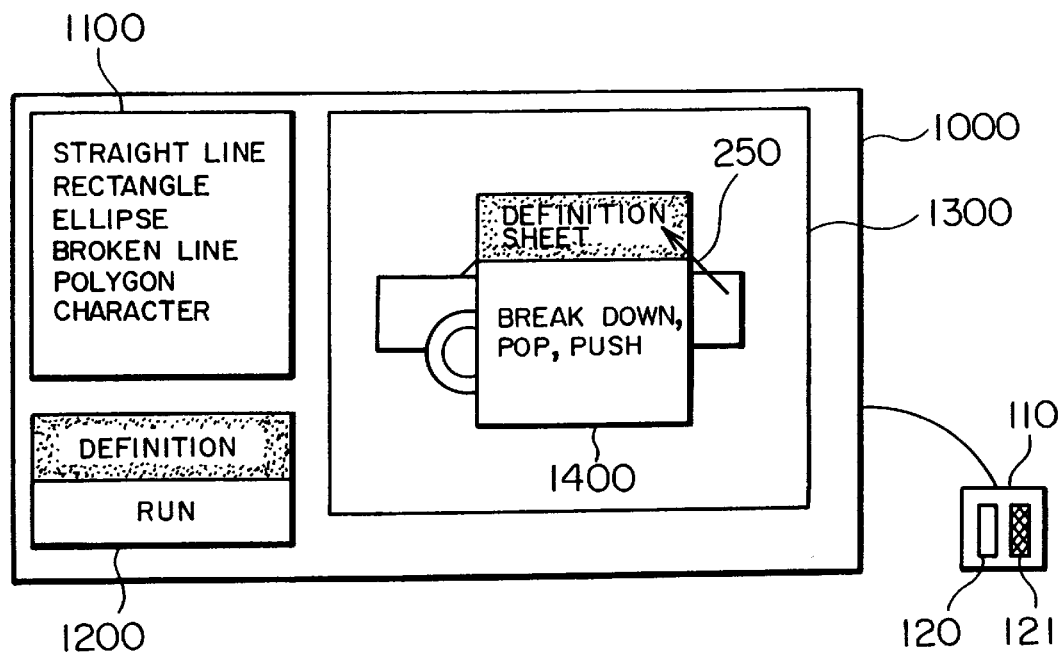
Figure 4:
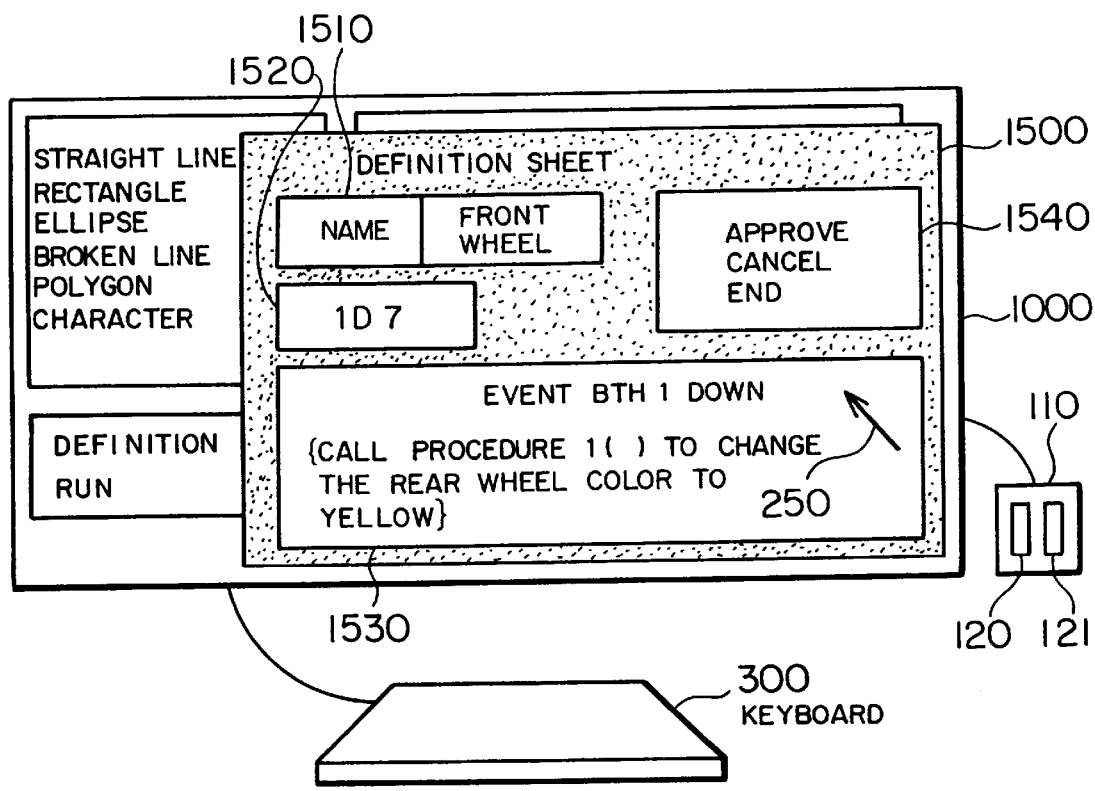

After object specification, the depression of the button 121 of the mouse 110 causes appearance of such an menu 1400 as shown in FIG. 3 on the display screen. The menu 1400 is used to manipulate the specified figure. When an item "definition sheet" of the menu 1400 is selected, this causes such an action definition area 1500 as shown in FIG. 4 to be displayed on the screen. The area 1500 will be referred to as the definition sheet, hereinafter. In FIG. 4, reference numeral 1510 represents a character string input area for input of the name of an object, 1520 the identification number of the object, 1530 a character string input area for definition of the action of the object, 1540 a menu for manipulation of the definition sheet. Input of a character string to the character string input area 1510 or 1530 can be achieved by clicking an area to be input with use of the mouse 110 and then by stroking desired keys on the keyboard 300.

The action of an object can be defined by inputting a command stream or a program to the character string input area 1530 in accordance with a predetermined grammar. The contents to be defined are given in the following.

(1) A pair of event and processing procedure

Specifies the processing when an object accepts an event. An event is defined as the information of the operation of the mouse or keyboard connected to the information processing unit, the information being expressed in an abstract form interpretable to the interaction support system. An event consists of a field for storing therein the sort of the event such as the key depression and release of the keyboard 300, the movement of the mouse 110, or the depression and release of the button 120 or 121 as well as a field for storing therein coordinate values at which the event occurs. The event indicative of the key depression and release of the keyboard has not particular coordinate values and thus the coordinate value storage field of such an event is always blank. An object accepts an event which occurred when the cursor 250 is present within the circumscribed rectangle of the object. Event specification includes the specification of the sort of the event (depression, release or movement) and the specification of the device (one of the buttons 120 and 121 of the mouse 110, or ones of the keys of the keyboard 300) by which the event occurred. The processing procedure is defined as a combination of message transmission to the object and procedure call into an application program 1600. The message transmission consists of the specification of a name or identification number of an object as a message accepter as well as the name of the message. The message name is applied to a job which the object or the application program 1600 asks another object. The object, when accepting the message, executes the following procedure defined as a pair of specified message name and processing procedure.

In the example of FIG. 4, the contents "if one of the buttons is depressed then call procedure 1() and ask to change the color of the rear wheel to yellow" is defined as the event and processing procedure pair.

(2) A pair of message and processing procedure

Specifies the processing when a message is sent from the application program 1600 or another object. How to specify the processing procedure is the same as in the above paragraph (1).

After the completion of an action definition on the definition sheet 1500, selection of an item "deposit" of the menu 1540 causes the contents of the action definition to be deposited as a data. Subsequently, selection of an item "end" of the menu 1540 and then selection of an item "execution" of the definition menu 1200 can cause the execution of the contents of the action definition. FIG. 5 shows such an execution mode of the present system. In the drawing, when the front wheel in the car picture is clicked with use of the mouse 110, this causes the calling and execution of the procedure 1() in the application program 1600 specified in a call mode of the present system and thereafter the asking of the color of the rear wheel to yellow.

Figure 18:
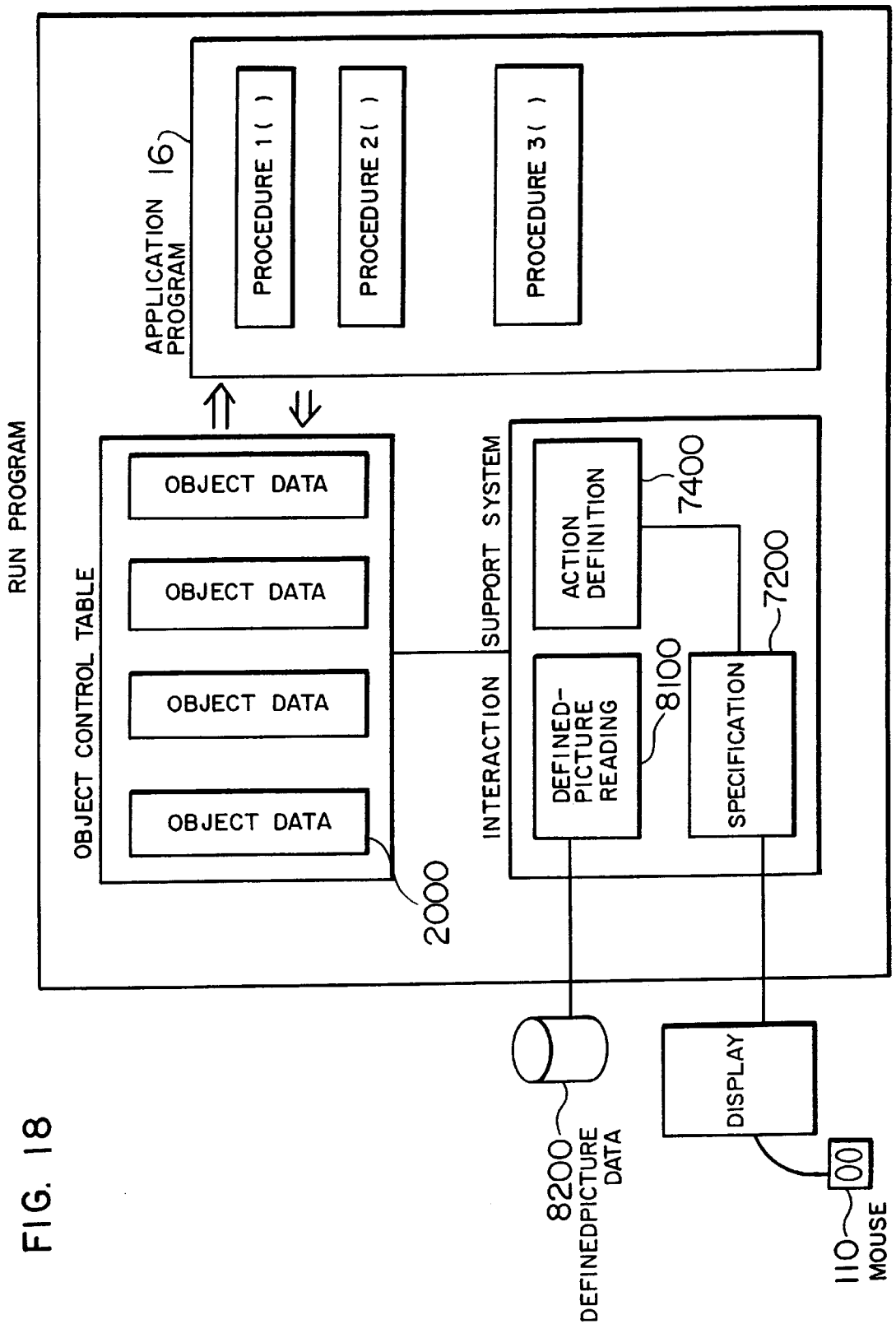
FIG. 18 is an arrangement of a run program comprising defined-picture reading means in place of drawing means.
Figure 19:
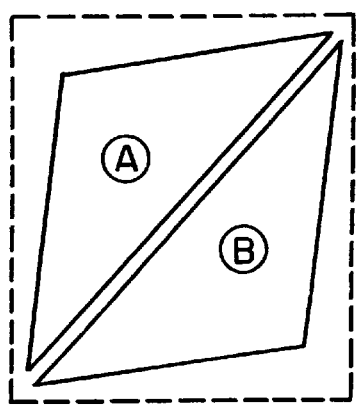
FIG. 19 shows an example of two objects having a common overlapped circumscribed rectangle area.

Explanation has been made as to the schematic procedure according to which the screen of the run program is defined with the use of the interaction support system of the present embodiment. The foregoing interaction support system has the drawing means, but the means is not always necessary. For example, there may be considered such a system arrangement that, as shown in FIG. 18, a defined picture previously prepared is read into a desired run program through its defined-picture reading means and the screen of the run program is defined by providing a similar action definition in response to the reading operation.

Explanation will be made as to the data structure and processing procedure of the present system.

Explanation will be made about a data structure corresponding to one of objects on the screen, by referring to FIG. 8. In the drawing, reference numeral 2000 denotes a data on an object, 2001 a data indicative of the coordinate values of lower left and upper right corner points in the circumscribed rectangle of the object, 2002 a data indicative of the identification numbers of figure elements in the object, 2003 a pointer (event dictionary) to a table in which the identification numbers of lower objects or subobjects in the object placed, 2004 a pointer to a table showing relationships between events and processing procedures, 2005 a pointer (message dictionary) to a table showing relationships between messages and processing procedures. When an object consists of a single fundamental figure, the identification numbers of figure elements within a display data corresponding to the fundamental figure are placed; whereas, when an object is made up of a plurality of objects, minus 1 (−1) is placed. In the case where an object is made up of a plurality of objects, the former object will be referred to hereinafter as the upper object and the latter objects will be referred to as the lower objects or subobjects. When an object has not any lower objects, a nil pointer is placed in the data field 2003 to indicate that the field is blank. Similarly, if the event and processing procedure pair is not defined then a nil pointer is placed in the data field 2004, whereas if the message and processing procedure pair is not defined then a nil pointer is placed in the data field 2005.

Figure 8:
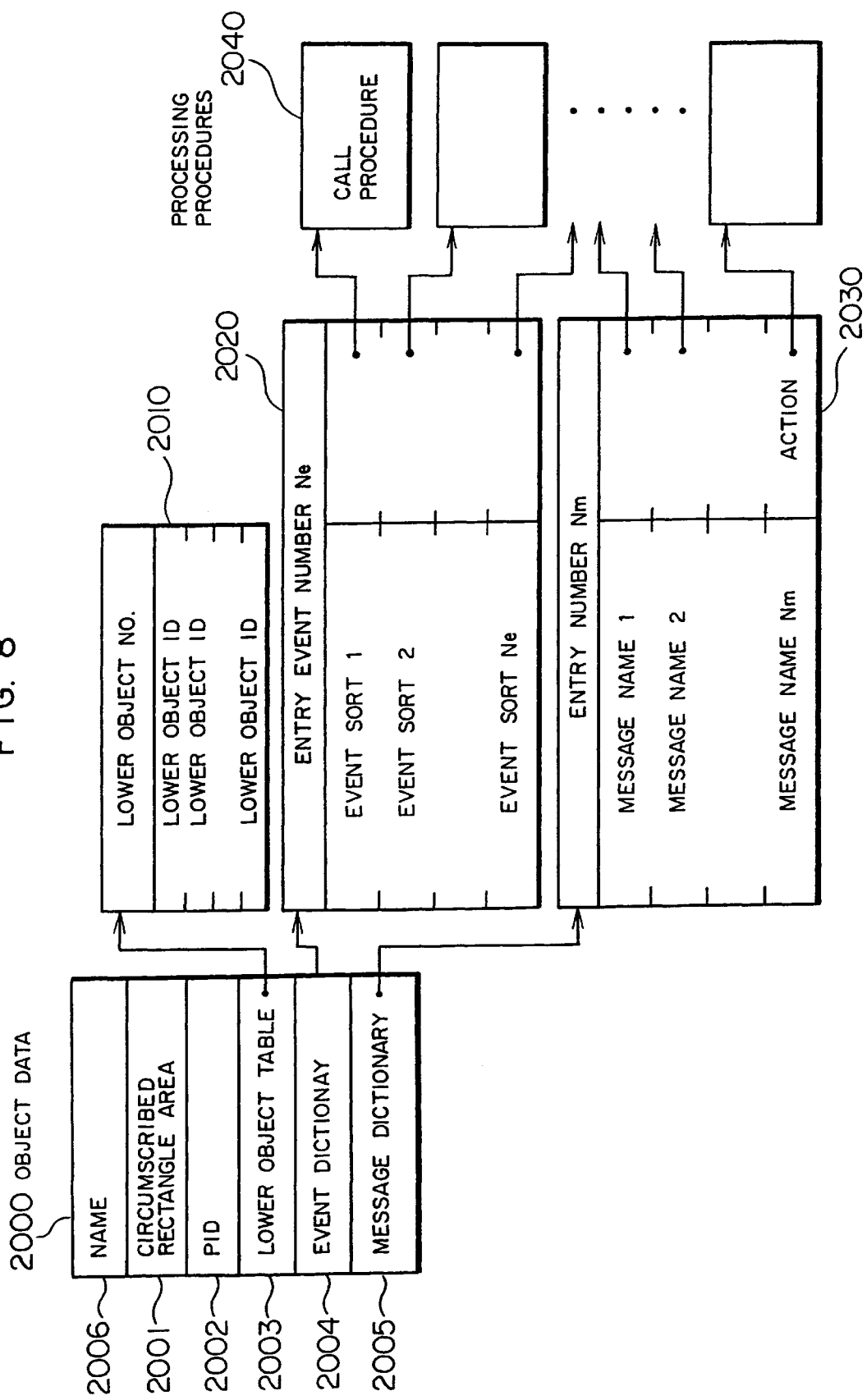
FIG. 8 shows a data structure of an object.

In FIG. 8, a table 2010 places therein the number of subobjects and the identification numbers of the subobjects, a table 2020 shows pairs of event sorts and 20 pointers to areas 2040 storing therein processing procedures corresponding to the events. A table 2030 shows pairs of message names and pointers to areas storing therein processing procedures corresponding to the event sorts.

Figure 9:
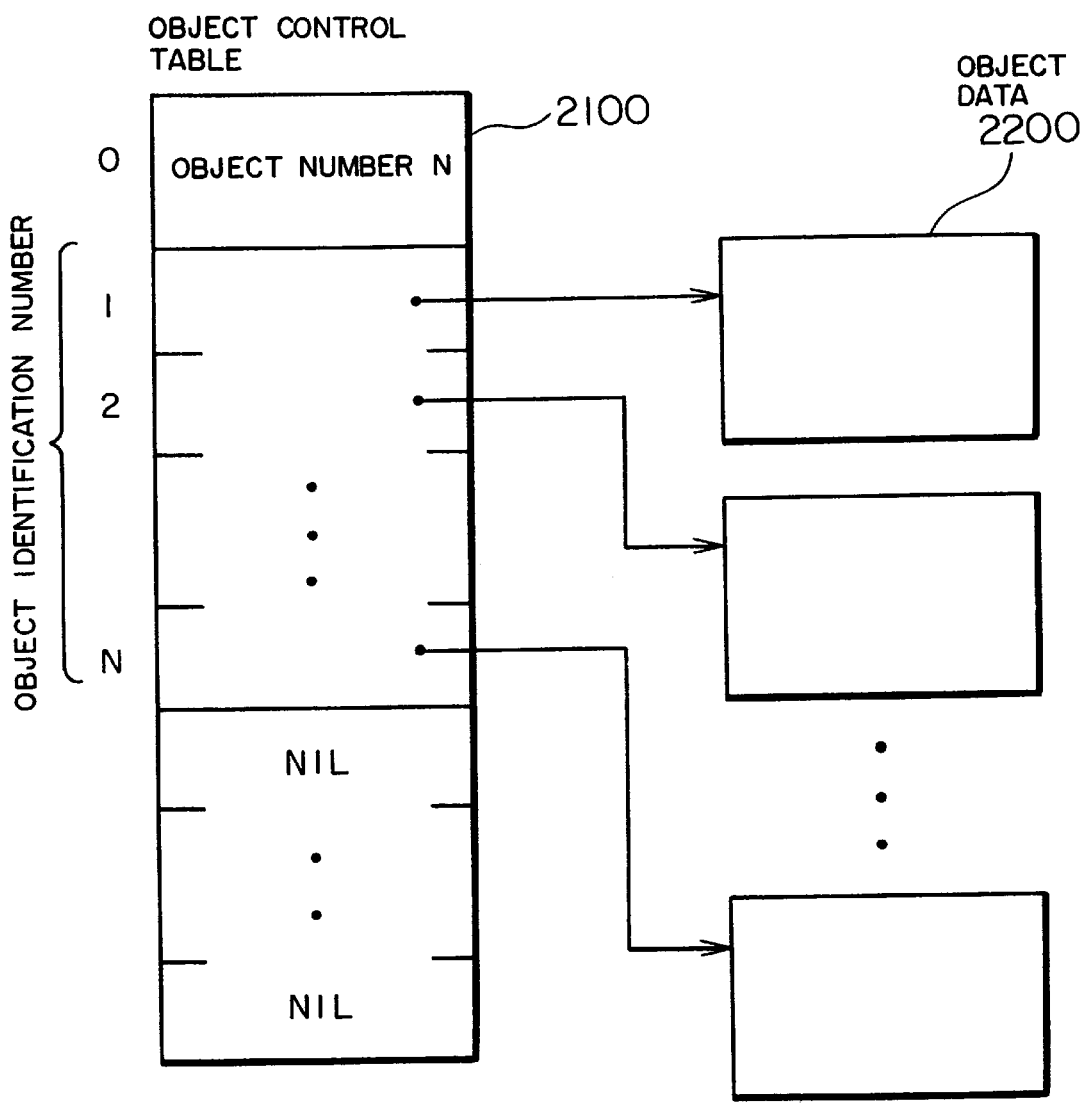
FIG. 9 shows a structure of an object control table.

Objects created by the present system are controlled by such an object control table 2100 as shown in FIG. 9. Placed in the table 2100 are the total number of all the objects within the system and pointers to the objects. When the contents of an object is extracted from the object control table on the basis of the identification number of the object as an index, a pointer to an object data 2200 associated with the object can be obtained.

Figure 10:
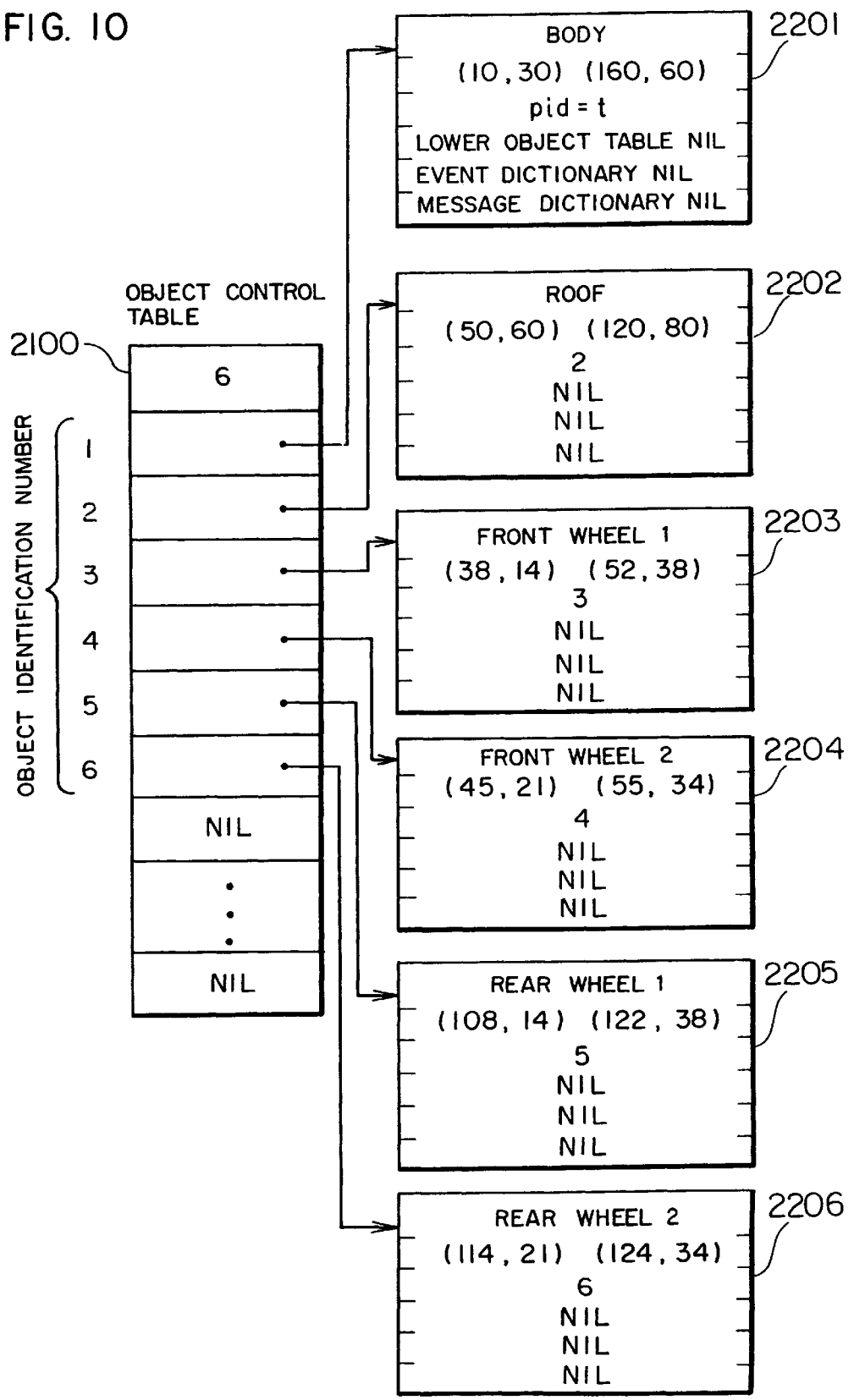
FIG. 10 is an example of data of objects consisting of each only a fundamental figure.
Figure 12A:
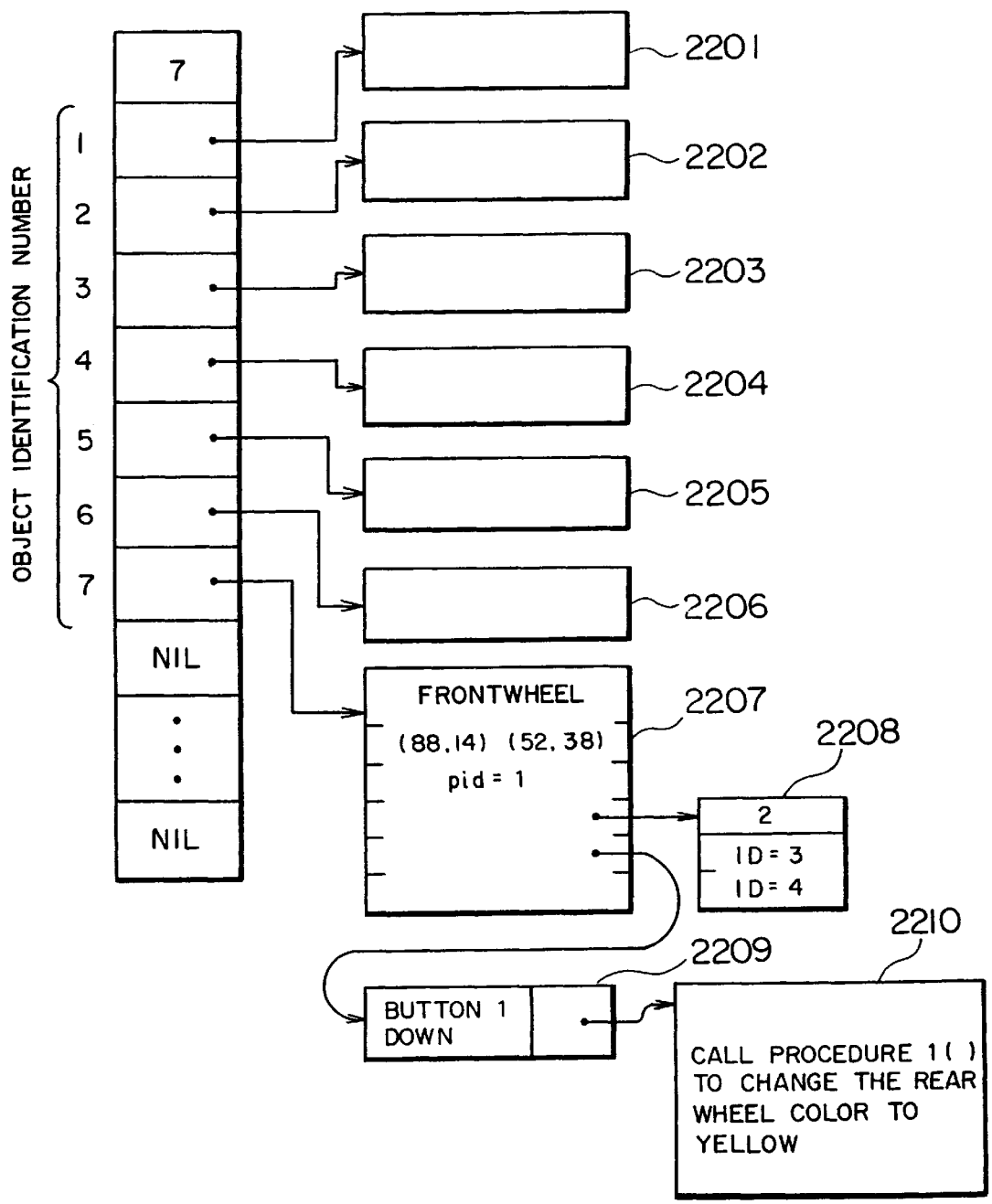
FIGS. 12A and 12B show examples of data of objects having their lower objects, respectively.
Figure 12B:
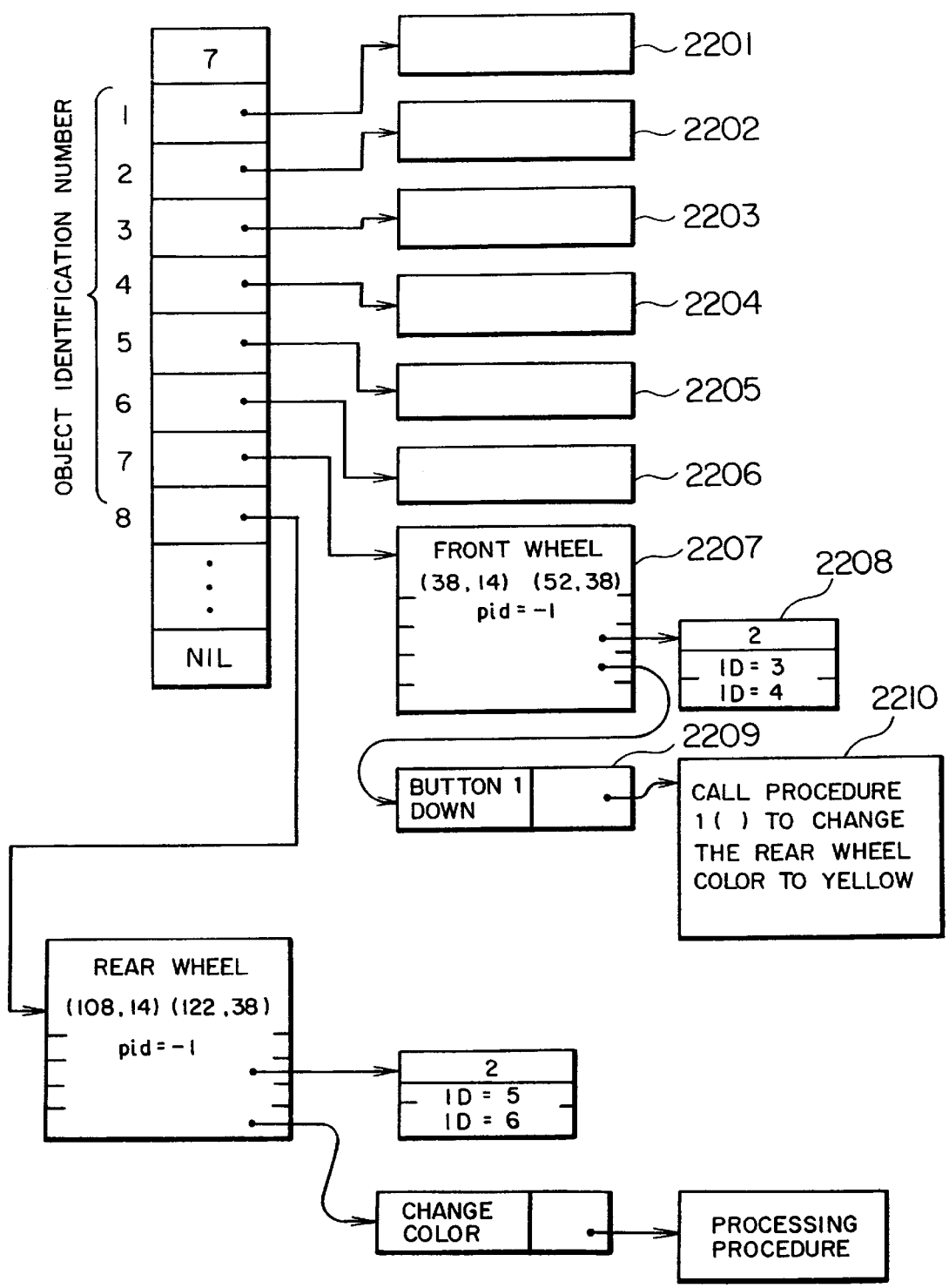

A particular example of FIG. 9 is shown in FIG. 10 in which object data created when figures of FIG. 11 are drawn on the screen are given. In this case, all the objects correspond respectively to one fundamental figure having the same identification number as the identification number of the associated object, and their actions are not defined yet. Accordingly, nil pointers are placed in all of their subobject tables, event dictionaries and message dictionaries. When such an action definition as shown in FIG. 4 is given, this causes the creation of a new object data 2207 of two objects of identification numbers 3 and 4 corresponding to figure identification numbers 3 and 4 as shown in FIG. 12A. Since the object data 2207 has subobjects and an event-processing procedure pair, the data 2207 also has a subobject table 2208 and an event dictionary 2209 to a processing procedure 2210. Thereafter, when an action definition is similarly made to the rear wheel to receive a message, the corresponding object data is obtained as shown in FIG. 12B.

The processing procedure according to which the defined action is actually executed will be explained by referring to FIGS. 13 to 16. When the user moves or operates the mouse 110 or the keyboard 300, an event occurs. The system searches for an object which is to accept the occurred event, and checks whether or not there is a processing procedure which forms a pair with the occurred event in the corresponding object. If there is present the corresponding processing procedure then the system executes it. Since an object has a hierarchical structure, event transfer processing is recursively repeated. That is, when the event is transferred to an object, the event is then transferred sequentially to the subobjects of the object. Similarly, the subobject, when having accepted the event, further transfers the event sequentially to further lower objects.

Explanation will now be made as to the processing procedure when an object accepts an event, by referring to a flowchart of FIG. 13. When an object accepts an event, the system first checks the coordinate field of the event to determine whether or not the event occurred within its own circumscribed rectangle area (step 3000). If the determination is NO, then the state is set at −1 and control is transferred back to the place from which the event has been transferred (returned to the caller of the present processing routine) (step 3080). If the determination at the step 3000 is YES and the event has its lower objects (step 3010), then the event is sequentially transferred to the lower objects (step 3020). If any of the lower objects has not any event-processing procedure pair corresponding to the sort of the event (if the state is not "1" when control is returned from the lower objects), then the system searches for its own event dictionary to find the corresponding event-processing procedure pair (step 3040). When the system finds the corresponding event-processing procedure pair, it executes its processing (step 3050), sets the state at "1" and thereafter returns control to the calling program or an upper object or parent object (step 3060). When the system fails to find the corresponding event-processing procedure pair, it sets the state at "0" and then returns control to the calling program or upper object (step 3070).

Figure 13:
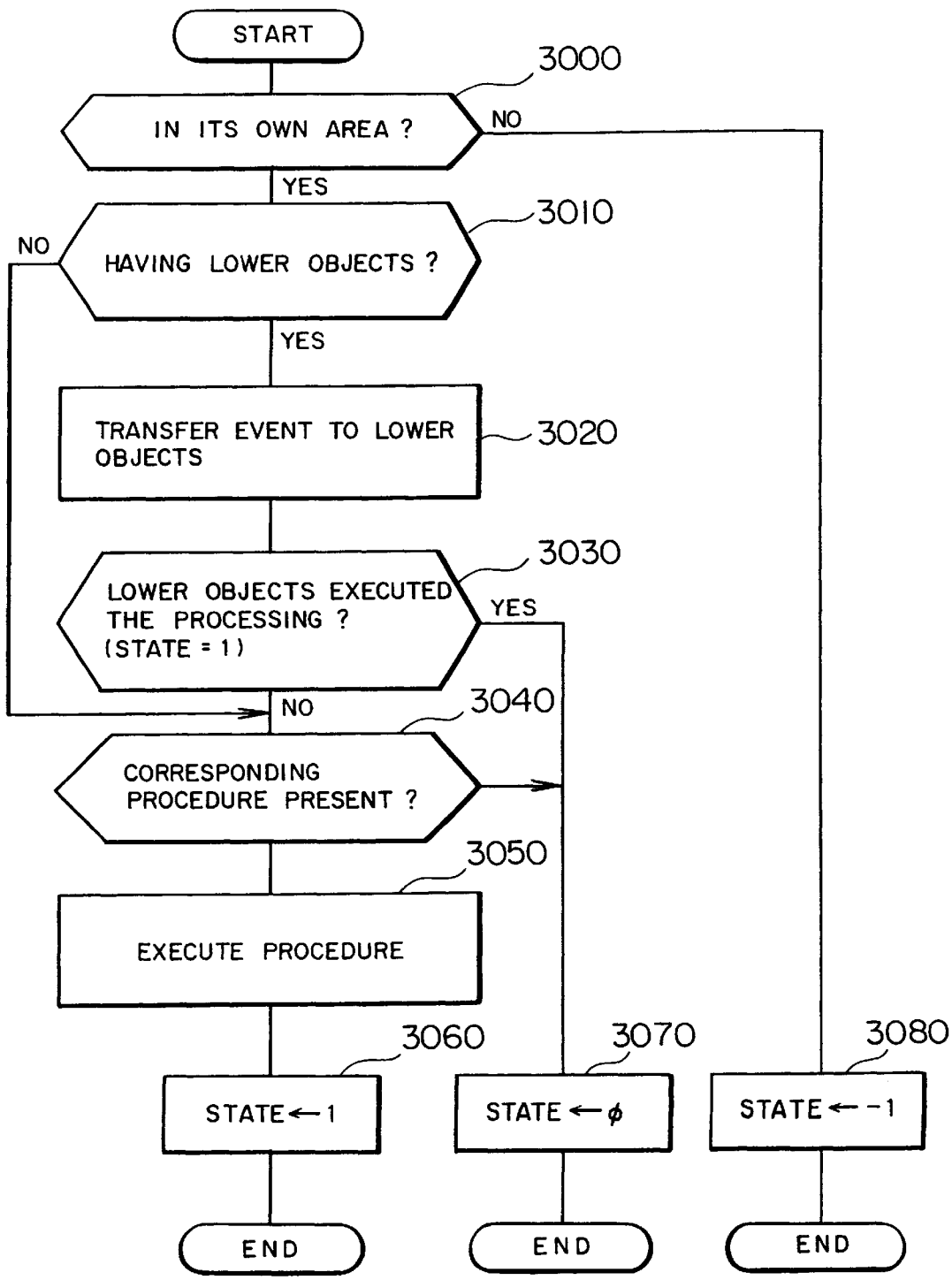
FIG. 13 is a flowchart showing the processing in a run mode.
Figure 14:
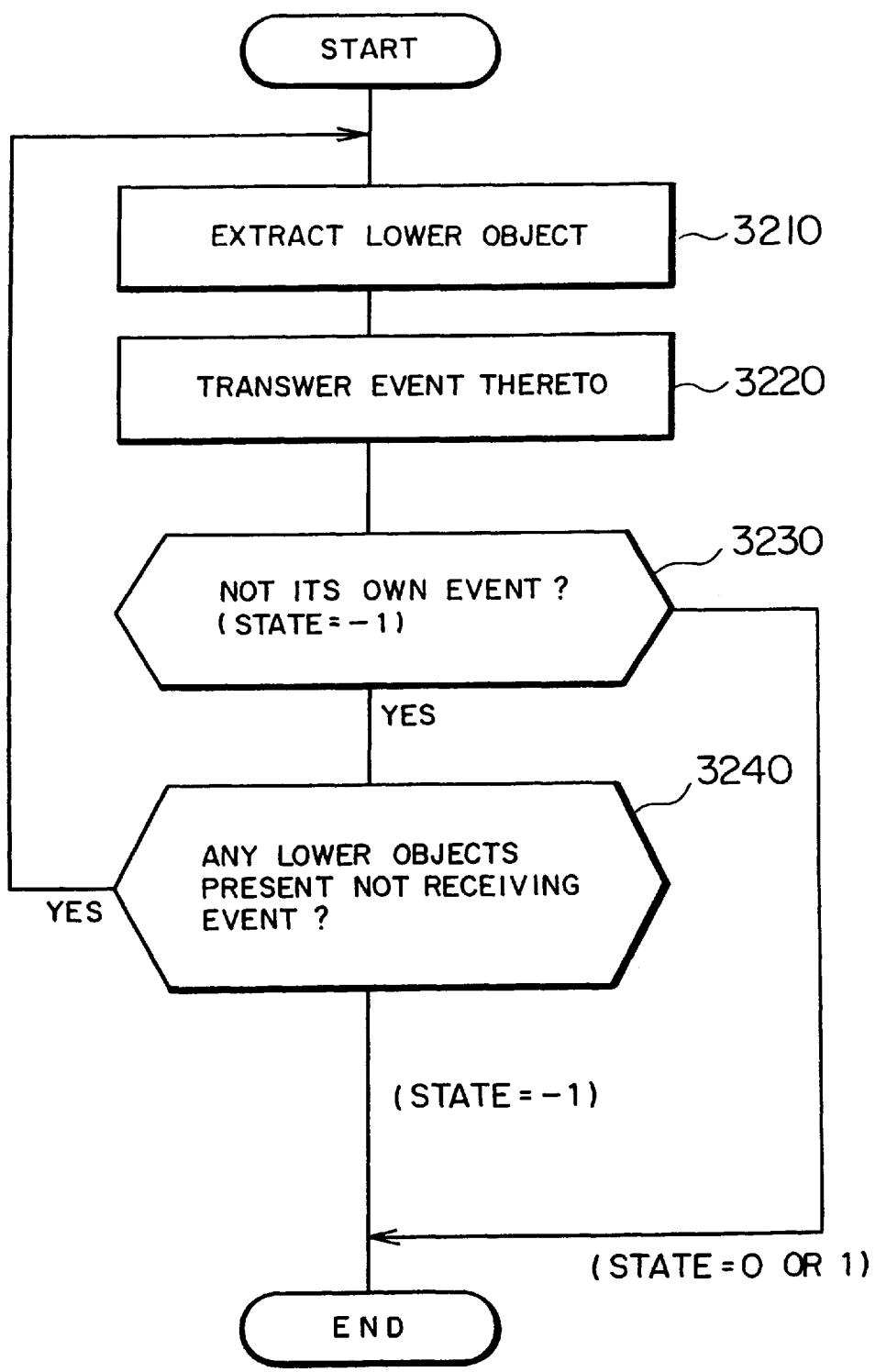
FIG. 14 is a flowchart for explaining in detail a part of the processing procedure of FIG. 13.

FIG. 14 is a flowchart for explaining in detail the processing of the step 3020 in FIG. 13. The system makes a reference to the lower object table 2010 (step 3210) to transfer the event sequentially to the lower objects (step 3220). In the step 3220, the processing explained in FIG. 13 is recursively called. Steps 3210 and 3200 are repeated until the system finishes checking all the lower objects or until the state is set at "0" or "1" as a result of processing of the step 3220 (steps 3230 and 3240).

Figure 15:
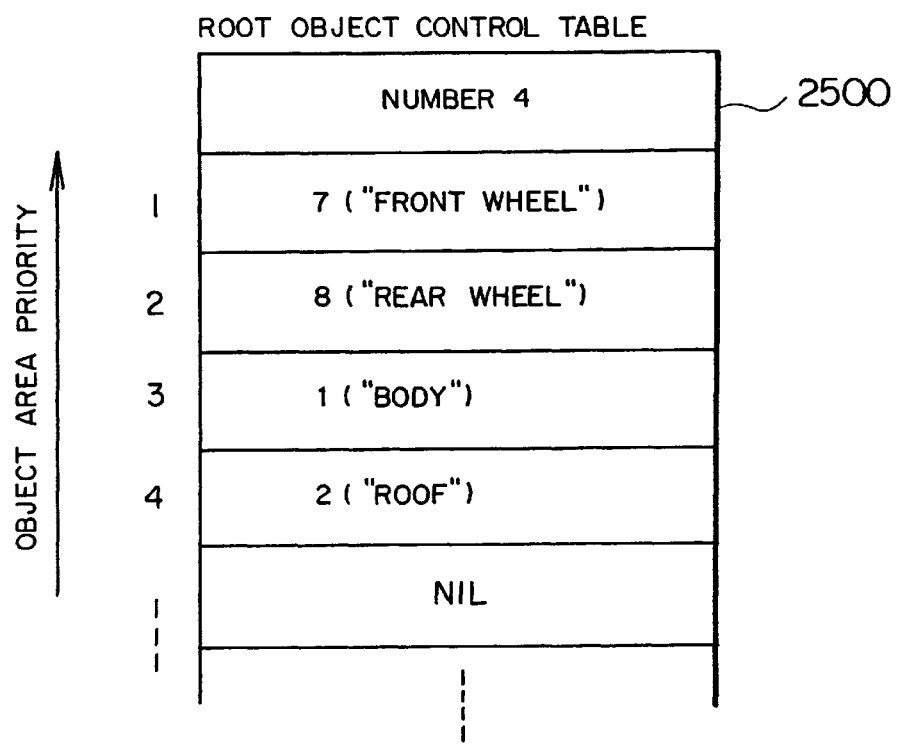
FIG. 15 shows a data structure of a root object control table.
Figure 16:
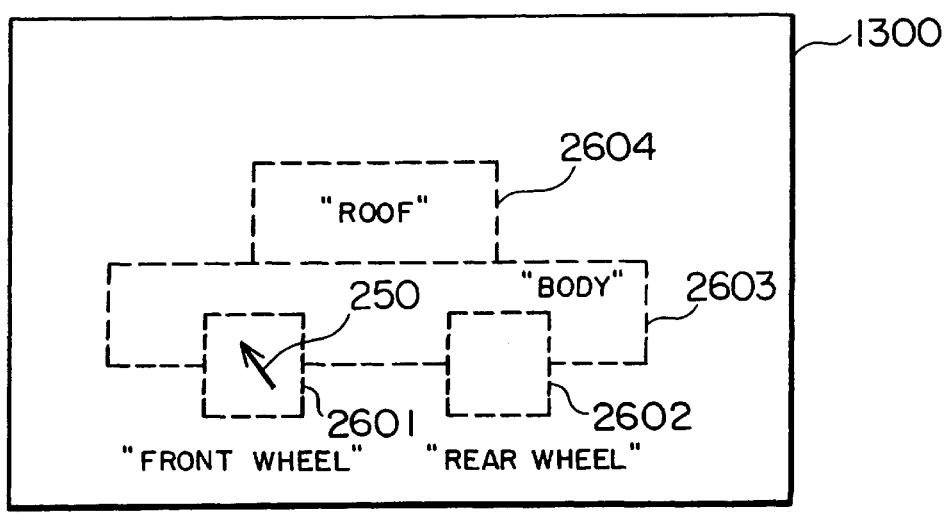
FIG. 16 is a diagram for explaining the priority of object areas.

The event is first transferred to an uppermost object. The uppermost object is defined as an object which is not one of the lower objects of another object. The uppermost object is stored in a root object control table. The structure of such a root object control table 2500 is shown in FIG. 15. Stored in the root object control table 2500 are the number of such uppermost objects and the identification numbers of the uppermost objects arranged in the order to transfer the event. For example, if an event occurs when the cursor 250 is present in the overlapped area between a circumscribed rectangle area 2601 of an object "front wheel" and a circumscribed rectangle area 2603 of an object "body", the event is transferred first to the object "front wheel" registered at the upper position in the root object control table 2500 as shown in FIG. 16. Only when the object "front wheel" did not execute the processing procedure corresponding to the event, the event is transferred to the object "body".

Figure 20:
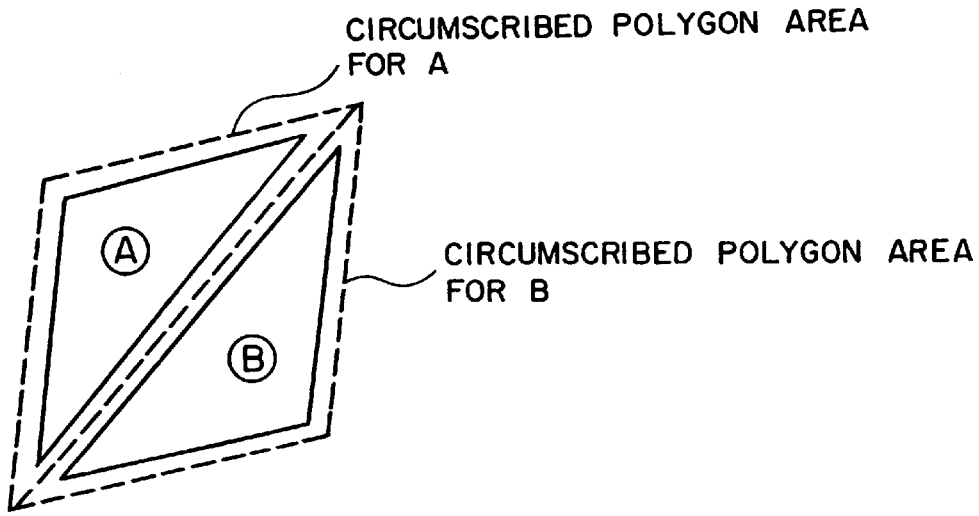
FIG. 20 is an example of the two objects of FIG. 19 but having their different circumscribed polygon areas.

In the foregoing embodiment, there has been employed such a method of transferring an object to an event that the circumscribed rectangle area of the object is compared with the coordinate value information of the event so that, if the event is present in the circumscribed rectangle area, then the object is transferred to the object. The circumscribed rectangle is determined by four combinations of the maximum and minimum X coordinate values and maximum and minimum Y coordinate values of its four corner points. However, it is also possible to provide not a circumscribed rectangle area but a circumscribed polygon area to an object and to perform event area judgement on the basis of the circumscribed polygon. In the latter case, even such objects A and B having an overlapped common circumscribed rectangle areas shown in FIG. 19 can be discriminated as shown in FIG. 20 and thus the event can be transferred to the separate objects A and B. This can be realized by using the coordinate values (x,y) of the corner points of the respective polygons as area specification information.

It is further considered such a method of transferring an event to an object without the use of such object area. In this method, the coordinate value information of an event is informed to the drawing processor to acquire the identification numbers of figure elements located close to the event occurrence location and transfer the event to an object having the acquired figure identification numbers. The drawing processor used herein may be made in the form of hardware or software, as necessary.

What is claimed is:

1. An interactive display defining system for building a graphic user interface of an application program, comprising:

means for displaying a drawing area and a drawing menu on a display screen, said drawing menu including at least one of a figure element composed of a straight line, a figure element composed of a rectangle, a figure element composed of a broken line, a figure element composed of a polygon, a figure element composed of a circle, a figure element composed of an ellipse, and a figure element composed of a free curve defined by a plurality of dots;

means for receiving a figure element selected from said drawing menu and displaying the selected figure element in said drawing area of the display screen;

definition means for selecting an assembly of at least one figure element of figure elements displayed on said drawing area and defining, in corresponding relation with said selected assembly, at least a processing to be performed when said selected assembly is subsequently selected; and operation execution means for executing said processing when a figure element included in said selected assembly is subsequently selected.

2. Interactive display defining system according to claim 1, further comprising:

operation defining means for defining an operation and storing said defined operation in corresponding relationship with a selected at least one figure element; and operation execution means for executing a processing corresponding to said selected at least one figure element when said selected at least one figure element is manipulated.

3. An interactive display defining method of building a graphic user interface of an application program, comprising the steps of:

displaying a drawing area and a drawing menu on a display screen, said drawing menu including at least one of a figure element composed of a straight line, a figure element composed of a rectangle, a figure element composed of a broken line, a figure element composed of a polygon, a figure element composed of a circle, a figure element composed of an ellipse, and a figure element composed of a free curve defined by a plurality of dots;

receiving a figure element selected from said drawing menu and displaying the selected figure element in said drawing area of the display screen;

selecting an assembly of at least one figure element of figure elements displayed on the drawing area and defining, in corresponding relation with said selected assembly, at least a processing to be performed when said selected assembly is subsequently selected; and executing said processing when a figure element included in said selected assembly is subsequently selected.

4. Interactive display defining method according to claim 3, further comprising the steps of:

defining an operation and storing said defined operation in corresponding relationship with a selected at least one figure element; and executing a processing corresponding to said selected at least one figure element when said selected at least one element is manipulated.

5. An interactive display defining system for building a graphic user interface of an application program, comprising:

means for displaying a drawing area and a drawing menu on a display screen, said drawing menu including at least one of a figure element composed of a straight line, a figure element composed of a rectangle, a figure element composed of a broken line, a figure element composed of a polygon, a figure element composed of a circle, a figure element composed of an ellipse, and a figure element composed of a free curve defined by a plurality of dots;

means for receiving a figure element selected from said drawing menu and displaying the selected figure element in said drawing area of the display screen;

action definition means for selecting an assembly of at least one figure element of figure elements displayed on said drawing area and defining, in corresponding relation with said selected assembly, at least an action to be performed when said selected assembly is subsequently selected; and action execution means for executing said action when a figure element included in said selected assembly is subsequently selected.

6. An interactive display defining method of building a graphic user interface of an application program, comprising the steps of:

displaying a drawing area and a drawing means on a display screen, said drawing menu including at least one of a figure element composed of a straight line, a figure element composed of a rectangle, a figure element composed of a broken line, a figure element composed of a polygon, a figure element composed of a circle, a figure element composed of an ellipse, and a figure element composed of a free curve defined by a plurality of dots;

receiving a figure element selected from said drawing menu and displaying the selected figure element in said drawing area of the display screen;

selecting an assembly of at least one figure element of figure elements displayed on said drawing area and defining, in corresponding relation with said selected assembly, at least an action to be performed when said selected assembly is subsequently selected; and executing said action when a figure element included in said selected assembly is subsequently selected.

7. An interactive display defining system for building a graphic user interface of an application program, comprising:

a display apparatus which displays a drawing area, a drawing menu, and a figure element selected from said drawing menu in said drawing area of a display, said drawing menu having as an object to be selected at least one of a figure element composed of straight line, a figure element composed of a rectangle, a figure element composed of a broken line, a figure element composed of a polygon, a figure element composed of a circle, a figure element composed of an ellipse, and a figure element composed of a free curve defined by a plurality of dots;

a defining apparatus which selects an assembly of at least one figure element of figure elements displayed on said drawing area and defines, in corresponding relation with said selected assembly, an operation of said selected assembly; and an operation executing apparatus which executes said operation of said selected assembly when a figure element included in said selected assembly is selected.

8. A computer program stored on a storage medium for building a graphic user interface of an application program, said computer program when executed by a computer causes said computer to perform the steps of:

displaying a drawing area and a drawing menu on a display screen, said drawing menu including at least one of a figure element composed of a straight line, a figure element composed of a rectangle, a figure element composed of a broken line, a figure element composed of a polygon, a figure element composed of a circle, a figure element composed of an ellipse, and a figure element composed of a free curve defined by a plurality of dots;

receiving a figure element selected from said drawing menu and displaying the selected figure element in said drawing area of the display screen;

selecting an assembly of at least one figure element of figure elements displayed on the drawing area and defining, in corresponding relation with said selected assembly, at least a processing to be performed when said selected assembly is subsequently selected; and executing said processing when a figure element included in said selected assembly is subsequently selected.

9. A computer program according to claim 8, wherein said computer program when executed further causes said computer to perform the steps of:

defining an operation and storing said defined operation in corresponding relationship with a selected at least one element; and executing a processing corresponding to said selected at least one element when said selected at least one element is manipulated.

10. A computer program stored on a storage medium for building a graphic user interface of an application program, said computer program when executed by a computer causes said computer to perform the steps of:

displaying a drawing area and a drawing means on a display screen, said drawing menu including at least one of a figure element composed of a straight line, a figure element composed of a rectangle, a figure element composed of a broken line, a figure element composed of a polygon, a figure element composed of a circle, a figure element composed of an ellipse, and a figure element composed of a free curve defined by a plurality of dots;

receiving a figure element selected from said drawing menu and displaying the selected figure element in said drawing area of the display screen;

selecting an assembly of at least one figure element of figure elements displayed on said drawing area and defining, in corresponding relation with said selected assembly, at least an action to be performed when said selected assembly is subsequently selected; and executing said action when a figure element included in said selected assembly is subsequently selected.

11. A computer program stored on a storage medium for building a graphic user interface of an application program, said computer program when executed by a computer causes said computer to perform the steps of:

displaying a drawing area, a drawing menu, and a figure element selected from said drawing menu in said drawing area of a display, said drawing menu having as an object to be selected at least one of a figure element composed of straight line, a figure element composed of a rectangle, a figure element composed of a broken line, a figure element composed of a polygon, a figure element composed of a circle, a figure element composed of an ellipse, and a figure element composed of a free curve defined by a plurality of dots;

selecting an assembly of at least one figure element of figure elements displayed on said drawing area and defining, in corresponding relation with said selected assembly, an operation of said selected assembly; and executing said operation of said selected assembly when a figure element included in said selected assembly is selected.

12. An interactive display defining method of building a graphic user interface of an application program, comprising the steps of:

displaying a drawing area, a drawing menu, and a figure element selected from said drawing menu in said drawing area of a display, said drawing menu having as an object to be selected at least one of a figure element composed of straight line, a figure element composed of a rectangle, a figure element composed of a broken line, a figure element composed of a polygon, a figure element composed of a circle, a figure element composed of an ellipse, and a figure element composed of a free curve defined by a plurality of dots;

selecting an assembly of at least one figure element of figure elements displayed on said drawing area and defining, in corresponding relation with said selected assembly, an operation of said selected assembly; and executing said operation of said selected assembly when a figure element included in said selected assembly is selected.

* * * * *